United States Patent [19]

Kyoto et al.

[11] Patent Number: 4,902,325

[45] Date of Patent: Feb. 20, 1990

[54] METHOD FOR PRODUCING GLASS PREFORM FOR OPTICAL FIBER

[75] Inventors: Michihisa Kyoto; Minoru Watanabe; Shigeru Tanaka, all of Yokohama; Motohiro Nakahara, Mito, all of Japan

[73] Assignees: Sumitomo Electric Industries, Ltd., Osaka; Nippon Telegraph and Telephone Corporation, Tokyo, both of Japan

[21] Appl. No.: 928,727

[22] Filed: Nov. 10, 1986

Related U.S. Application Data

[63] Continuation of Ser. No. 746,062, Jun. 18, 1985, abandoned.

[30] Foreign Application Priority Data

Jun. 18, 1984 [JP] Japan ................................ 59-123783

[51] Int. Cl.$^4$ .......................................... C03B 37/027
[52] U.S. Cl. ........................................ 65/3.12; 65/13; 65/31; 65/32.1; 65/900
[58] Field of Search ................... 65/2, 3.12, 13, 30.12, 65/18.2, 31, 32, 900

[56] References Cited

U.S. PATENT DOCUMENTS 4,263,031  4/1981  Schultz ................................. 65/3.12
4,304,583  12/1981 Aronson et al. ................. 65/3.12 X
4,338,111  7/1982  Edahiro et al. ..................... 65/18.2

Primary Examiner—Robert L. Lindsay
Attorney, Agent, or Firm—Cushman, Darby & Cushman

[57] ABSTRACT

A method for producing a glass preform for an optical fiber comprising forming a fine glass particle mass by flame hydrolysis of a glass raw material, dehydrating the fine glass particle mass in an oxygen atmosphere containing chlorine or a chlorine-containing compound at such temperature that the soot preform is not considerably shrunk and heating the soot preform at a temperature at which the soot preform is sintered and made transparent, the glass preform produced by which method contains less hydroxyl groups, structural defects and an optical fiber fabricated from said glass preform has stable light transmission characteristics for a long time.

5 Claims, 2 Drawing Sheets

METHOD FOR PRODUCING GLASS PREFORM FOR OPTICAL FIBER

This is a continuation of application Ser. No. 746,062, filed June 18, 1985, which was abandoned upon the filing hereof.

FIELD OF THE INVENTION

The present invention relates to a method for producing a glass preform for an optical fiber. More particularly, it relates to a method for for producing a glass preform for use in the fabrication of an optical fiber, by which contamination with impurities, residual water (i.e. hydroxyl groups), bubbles and interfacial irregularity as well as chemical defects in the glass preform are remarkably reduced so that deterioration of light transmission characteristics of glass is prevented.

BACKGROUND OF THE INVENTION

A glass preform made of silica glass containing substantially no transition metal such as iron is advantageously produced by the vapor-phase axial deposition method (hereinafter referred to as "VAD" method), which comprises flame hydrolyzing a halide of of Si, Ge, B or P in an oxyhydrogen flame and depositing formed fine glass particles on a seed member to obtain a fine glass particle mass, namely a porous soot preform.

The VAD method is suitable for the production of the glass preform for use in the economical fabrication of an optical fiber having low attenuation of light transmission, arbitrary distribution of refractive index in its radial direction and homogeneous composition in its longitudinal direction and on its circumference. According to the VAD method, the glass preform is produced as follows:

Fine glass particles are formed by flame hydrolysis of a starting glass material and then deposited on a rotating seed member such as a glass plate or rod in the flame to form a cylindrical fine glass particle mass with an adequate refractive index distribution in the radial direction. The fine glass particle mass is then sintered at a high temperature to obtain a transparent glass preform.

Advantages of the VAD method are that the yield of the starting glass material is good, that the glass preform contains less impurities except hydroxyl groups, that the production time is short, that the distribution of the refractive index is easily controlled, and that the method includes fewer steps. Therefore, the VAD method is valuable for mass production of the optical fiber.

However, the glass preform inevitably contains unreacted water in an amount of 30 to 70 ppm since the VAD method includes hydrolysis.

Recently, it is increasingly desired to use a wavelength range near 1.3 micrometer at which absorption loss due to structural imperfection is lowest for optical transmission purpose. Since the absorption loss due to the residual hydroxyl groups is, however, serious in this wavelength range, it is necessary to decrease the amount of the hydroxyl groups in the optical fiber to 0.3 ppm or less.

For this end, it is proposed to remove water in the fine glass particle mass, from which the glass preform is produced by sintering, by decomposing water with chlorine ($Cl_2$) or a chlorine-containing compound (e.g. $SOCl_2$) to hydrogen chloride and oxygen (cf. Japanese Patent Publication Nos. 40096/1982 and 13503/1983). It is possible to considerably effectively remove water form the glass preform and to decrease the amount of the residual hydroxyl groups in the optical fiber to 0.1 ppm or less by using a dehydrating agent comprising chlorine or the chlorine-containing compound.

However, chlorine or the chlorine-containing compound not only acts as the dehydrating agent but also reacts with an additive for controlling the refractive index of glass (e.g. $GeO_2$, $P_2O_5$, etc.) and $SiO_2$ to form many structural defects in the glass preform. When an optical fiber is fabricated from the glass preform with structural defects, hydrogen gas, which is present in air in an amount of about 0.01% by mole, acts on the structural defects to form the hydroxyl groups. The thus formed hydroxyl groups increase the attenuation of light transmission and sometimes make it impossible to transmit light through the optical fiber.

It has been found that the number of the structural defects increases as the amount of the additive in the glass preform increases. From this fact, the reformation of the hydroxy group may proceed according to the following equation:

$$GeO(defect) + \tfrac{1}{2}H_2 \rightarrow GeOH \tag{I}$$

FIG. 1 shows change of attenuation of light transmission at various wavelength of an optical fiber which is fabricated from a glass preform dehydrated in the absence of oxygen. In FIG. 1, the chained line, the broken line and the solid line stand for the initial attenuation, that after 11 months and that after 16 months, respectively. From these results, it is seen that the absorption at a wavelength near 1.4 micrometer due to the presence of the hydroxyl groups increases as the time passes.

SUMMARY OF THE INVENTION

One object of the present invention is to provide a method for producing a glass preform for an optical fiber in which the content of the residual water or hydroxyl groups is greatly decreased.

Another object of the present invention is to provide a method for producing a glass preform for an optical fiber in which the formation of the structural defects is suppressed in the course of dehydration with a halogen-containing compound, particularly chlorine or a chlorine-containing compound and subsequent treatment of the glass preform.

Further object of the present invention is to provide a method for producing a glass preform, an optical fiber fabricated from which has stable light transmission characteristics for a long time.

Accordingly, the present invention provides a method for producing a glass preform for an optical fiber comprising forming a fine glass particle mass by flame hydrolysis of a glass raw material, dehydrating the fine glass particle mass in an oxygen atmosphere containing chlorine or a chlorine-containing compound at such temperature that the fine glass particle mass is not considerably shrunk and heating the soot preform at a temperature at which the fine glass particle mass is sintered and made transparent.

DETAILED DESCRIPTION OF THE INVENTION

In the glass preform, water is physically or chemically adsorbed by glass. Chemical adsorption is classified into weak one and strong one. Physically adsorbed water and weakly chemically adsorbed water is easily removed at a temperature higher than 500° C. In this case, when a dehydrating agent is present, readsorption of water is prevented so that water is more effectively removed. However, if the glass preform is not heated for a sufficiently long period of time, water molecules are adsorbed during sintering of the fine glass particle mass to be dissolved in the glass and/or to cause bubbles in the glass. Therefore, great care should be taken of the treating temperature and time, and the kind and concentration of the dehydrating agent. Since strongly chemically adsorbed water is not removed by heating, the surface of the fine glass particle should be treated by the dehydrating agent so that the hydroxyl group is converted into, for example, hydrogen chloride and liberated. In the case of using the dehydrating agent, higher treating temperature and higher concentration of the dehydrating agent are preferred.

For the dehydration of the fine glass particle mass, there are optimum ranges of the treating temperature and the concentration of the dehydrating agent for the following reasons.

As to the temperature, growth of the glass particles in the fine glass particle mass becomes vigorous from a temperature of about 1,000° C., and the fine glass particle mass begins thermally shrinking and decreasing the surface area. This prevents the dehydration. It is, therefore, necessary to select an optimum temperature range in which the growth of the glass particles does not prevent the dehydration, and the activity of the dehydrating agent is maintained as high as possible. In addition, the heating rate should be optimized in view of the thermal shrinkage of the fine glass particle mass. Of course, the temperature conditions have relationship with the presence of the dehydrating agent and its concentration.

The heating rate and subsequent temperature controlling procedure will be explained by making reference with a case in which chlorine ($Cl_2$) is used as the dehydrating agent.

Figure 1:
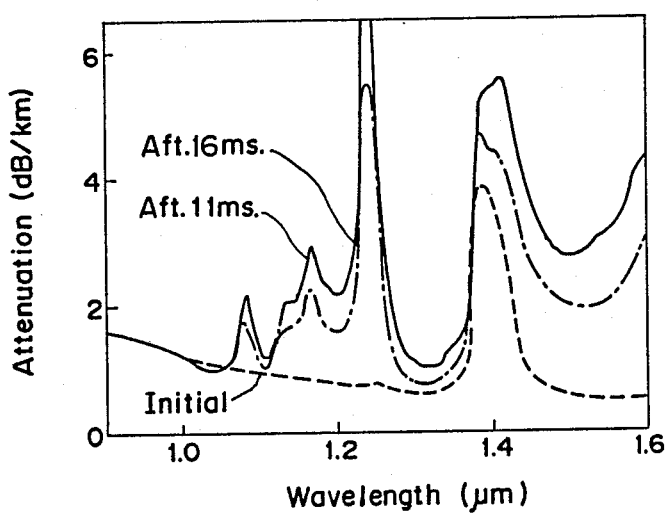
FIG. 1 shows change of attenuation of light transmission of an optical fiber produced by a conventional method.
Figure 2:
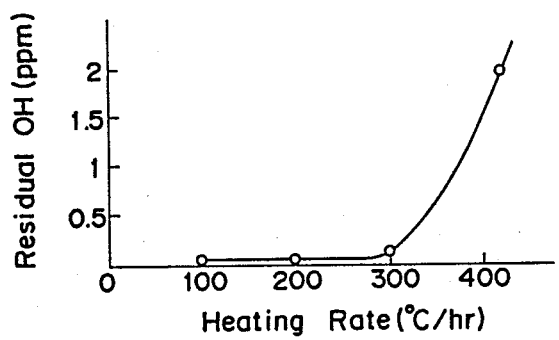
FIG. 2 is a graph showing a relationship between the heating rate and the amount of residual hydroxyl groups in the dehydrating step.

In the first heating step, the fine glass particle mass is placed in an atmosphere containing chlorine together with other gases such as oxygen and helium. A relationship between the heating rate and the amount of residual hydroxyl groups is shown in FIG. 2. As is seen from the results of FIG. 2, the fine glass particle mass so quickly shrinks at the heating rate larger than 300° C./hr that water is contained in glass and hardly removed. Therefore, in the first step of the sintering of the soot preform, it should be gradually heated at the heating rate not larger than 300° C./hr to achieve the gradual growth of the glass particles and to prevent quick shrinking of the fine glass particle mass.

Figure 3:
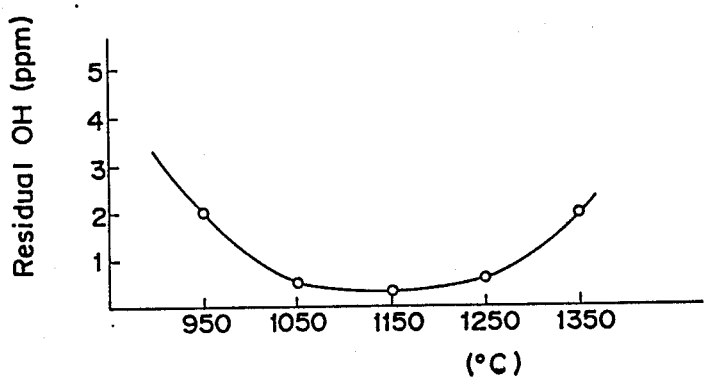
FIG. 3 is a graph showing a relationship between the amount of residual temperature and the heating temperature.

FIG. 3 shows a relationship between the amount of the residual hydroxyl groups and the heating temperature from beginning to completion of the dehydration of the preform. The soot preform is kept at a predetermined temperature for one hour. As is seen from FIG. 3, in a temperature range of about 950° to 1,250° C., the hydroxyl groups are most effectively removed and the shrinking of the preform is advantageously suppressed.

Now, a mechanism of the formation of the structural defects in the glass preform during dehydration will be explained.

At a high temperature, the dehydrating agent reacts with not only the hydroxyl group but also the glass material itself. For example, in case of chlorine, it reacts with glass according to following equation:

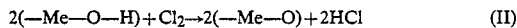

$$2(\text{—Me—O—H}) + Cl_2 \rightarrow 2(\text{—Me—O—}) + 2HCl \quad \text{(II)}$$

wherein Me is Si, Ge or P.

In addition, at such high temperature, the defect is formed by thermal reduction, for example, according to following equation in case of $GeO_2$:

$$GeO_2 \rightarrow GeO(\text{defect}) + \tfrac{1}{2}O_2 \quad \text{(III)}$$

Therefore, the defects are formed in an atmosphere of an inert gas such as helium containing chlorine.

Above described formation of the defects is ascertained by UV absorption of glass in which the presence of $Ge^{2+}$ is confirmed by absorption at a wavelength of 2,450 Å due to $Ge^{2+}$.

Figure 4:
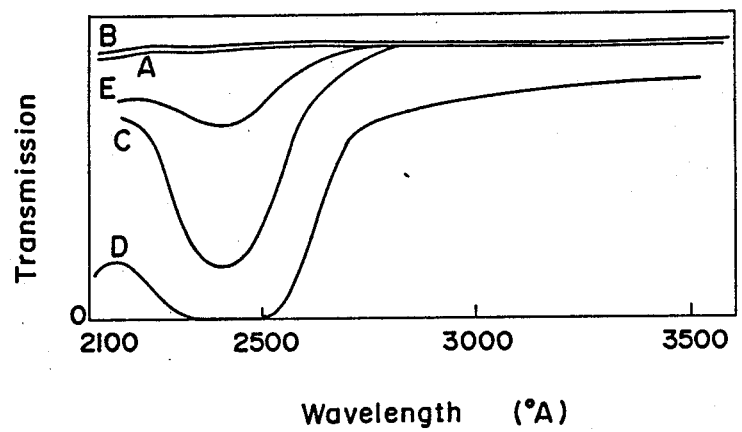
FIG. 4 shows UV absorption characteristics of various glass preforms, and FIG. 5 schematically shows the apparatus used in EXAMPLES.

Fig. 4 shows UV absorption characteristics (in arbitrary scale) of various glass preforms at various wavelength (Å). In FIG. 4, Curves A, B, C, D and E stands for UV absorption characteristics of (a) a dehydrated sintered preform of $SiO_2$ glass, (b) a $GeO_2$—$SiO_2$ glass preform according to the present invention, (c) a conventional $GeO_2$—$SiO_2$ glass preform, (d) a $P_2O_5$—$GeO_2$—$SiO_2$ glass preform and (e) a sintered but not dehydrated $GeO_2$—$SiO_2$ glass preform, respectively. As is seen from FIG. 4, the glass preform containing $GeO_2$ or $P_2O_5$ as an additive has more defects originated from $Ge^{2+}$.

The relationship between the presence of $Ge^{2+}$ and the absorption at a wavelength of 2,450 Å is described in detail by A. J. Cohen et al (J. Phys, Chem. Solids, 7, 301 (1958)).

As a result of the extensive study, it is found that the defects due to $Ge^{2+}$ is suppressed by carrying out the dehydration of the fine glass particle mass in an atmosphere of oxygen.

Accordingly, when the fine glass particle mass, namely the porous soot preform is heated at a temperature not higher than about 1,250° C. in an oxygen atmosphere containing chlorine or the chlorine-containing compound in an amount of 1 to 20% by mole, not only the hydroxyl groups are effectively removed but also the number of the defects in the glass preform is suppressed.

It is also preferred to carry out the sintering of the dehydrated preform in an atmosphere of an inert gas containing oxygen in an amount of not larger than 50%. If the amount of oxygen in the sintering atmosphere exceeds 50%, the transparent glass preform may contain bubbles.

The temperature at which the dehydrated fine glass particle mass is sintered in the second heating step is preferably from 1,400° to 1,800° C., more preferably from 1,600° to 1,700° C.

Curve B in FIG. 4 represents the UV absorption characteristics of the $GeO_2$—$SiO_2$ glass preform dehydrated and sintered according to the present invention and shows that the defects due to the presence of $Ge^{2+}$ are greatly reduced.

As the dehydrating agent, not only chlorine but also the chlorine-containing compound such as $CCl_4$, $SOCl_2$, $COCl_2$, $S_2Cl_2$, etc. is used in the present invention.

The present invention may be applied to any fine glass particle mass formed not only by the VAD method but also by any other methods.

The present invention will be hereinafter explained further in detail by following Examples, in which an apparatus schematically shown in FIG. 5 was used.

EXAMPLE 1

Figure 5:
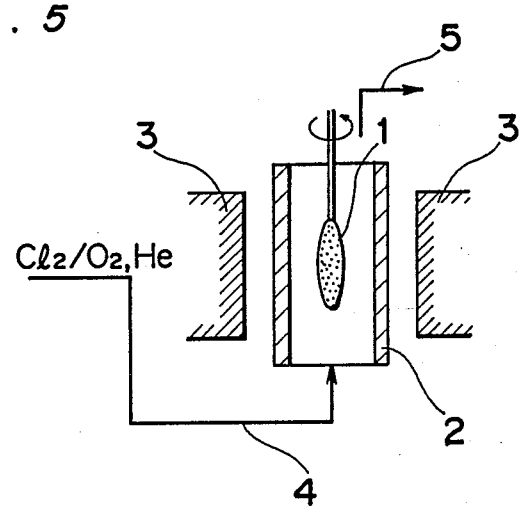

As shown in FIG. 5, a cylindrical fine glass particle mass 1 of $GeO_2$—$SiO_2$—$P_2O_5$ having a diameter of 60 mm and a length of 300 mm was placed in an aluminum muffle tube 2 having an inner diameter of 80 mm and a length of 1,000 mm installed in a furnace 3. The fine glass particle mass was heated with rotation at 2 to 3 rpm. When the temperature of the furnace 3 reached to 800° C., a gaseous mixture of 0.5 l of chlorine and 10 l of oxygen was introduced in the furnace through an inlet 4 and exhausted from an outlet 5 with raising the temperature of the furnace to 1,000° C. at a rate of 150° C. Then, the mass was kept standing at 1,000° C. for 1 hour.

Thereafter, the mass was heated at 1,650° C. with introducing helium alone to produce a transparent glass preform. The amount of the residual hydroxyl groups in the thus produced glass preform was 0.05 ppm.

An optical fiber fabricated from this glass preform contained 10% by weight of $GeO_2$ on the average.

The fabricated optical fiber was tested on the increase of the hydroxyl groups due to the presence of the defects as follows:

The optical fiber was heated to 200° C. to accelerate the reaction between the defects and hydrogen.

The increase of the hydroxyl groups due to the presence was practically negligible.

COMPARATIVE EXAMPLE

In the same manner as in EXAMPLE 1 but using helium in place of oxygen in the dehydration step, a fine glass particle mass was made transparent to produce a glass preform, from which an optical fiber was fabricated.

The amount of the residual hydroxyl groups in the glass preform was 0.05 ppm and the content of $GeO_2$ was 9.5% by weight on the average.

Under the same conditions as in EXAMPLE 1, the amount of the hydroxyl groups in the optical fiber was increased to 0.3 ppm after 24 hours, which corresponded to increase of attenuation of light transmission by 0.2 dB/km at a wavelength of 1.30 micrometer. This means that the optical fiber lost reliability.

EXAMPLE 2

In the same manner as in EXAMPLE 1 but inserting the fine glass particle mass 1 in the furnace kept at 1,200° C. at a descending rate of 3 mm/min. to dehydrate it and after the whole mass being placed in the furnace, sintering it, a transparent glass preform was produced.

The amount of the residual hydroxyl group, the content of $GeO_2$ and the light transmission characteristics of the optical fiber fabricated from the glass preform were substantially the same as those in EXAMPLE 1.

What is claimed is:

1. A method for producing a glass preform for an optical fiber comprising:
   forming a fine glass particle mass by flame hydrolysis of a glass raw material,
   dehydrating the fine glass particle mass in an atmosphere including essentially only oxygen and 1 to 20% by mole chlorine or a chlorine containing compound at such temperature that the perform is not considerably shrunk, and
   heating the preform at a temperature at which the preform is sintered and made transparent.

2. A method according to claim 1, wherein the temperature is raised to a dehydration temperature at a rate not larger than 300° C./hr.

3. A method according to claim 2, wherein the dehydration temperature is from 950° to 1,250° C.

4. A method according to claim 1, wherein the dehydrated fine glass particle mass is sintered in a helium atmosphere containing oxygen.

5. A method according to claim 4, wherein the helium atmosphere contains oxygen in an amount of not larger than 50%.

* * * * *